United States Patent [19]
Chastain et al.

[11] Patent Number: 4,812,972
[45] Date of Patent: Mar. 14, 1989

[54] MICROCODE COMPUTER HAVING DISPATCH AND MAIN CONTROL STORES FOR STORING THE FIRST AND THE REMAINING MICROINSTRUCTIONS OF MACHINE INSTRUCTIONS

[75] Inventors: David M. Chastain, Plano; Gary B. Gostin, Coppell, both of Tex.

[73] Assignee: Convex Computer Corporation, Richardson, Tex.

[21] Appl. No.: 88,470

[22] Filed: Aug. 19, 1987

Related U.S. Application Data

[63] Continuation of Ser. No. 622,634, Jun. 20, 1984, abandoned.

[51] Int. Cl.[4] .............................. G06F 9/28; G06F 9/32
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,953,833 | 4/1976 | Shapiro | 364/200 |
| 4,128,880 | 12/1978 | Cray, Jr. | 364/200 |
| 4,168,523 | 9/1979 | Chari et al. | 364/200 |
| 4,251,862 | 2/1981 | Murayama | 364/200 |
| 4,462,073 | 7/1984 | Grondakki | 364/200 |
| 4,467,415 | 8/1984 | Ogawa | 364/200 |
| 4,519,033 | 5/1985 | Vaughn et al. | 364/200 |
| 4,574,344 | 3/1986 | Harris et al. | 364/200 |
| 4,685,080 | 8/1987 | Rhodes, Jr. et al. | 364/900 |

OTHER PUBLICATIONS

Nissen, S. M. & Wallach, S. J., "The All Applications Digital Computer", ACM-IEEE Symposium on High-Level-Language Computer Architecture, Nov. 7 & 8, 1973.

Kogge, P. M., The Architecture of Pipelined Computers, 1981, Chaps. 2, 4 and 6.

Lorin, H., Parallelism in Hardware and Software: Real and Apparent Concurrency, 1972, Chap. 8.

Primary Examiner—Raulfe B. Zache
Assistant Examiner—Thomas C. Lee
Attorney, Agent, or Firm—Richards, Harris, Medlock & Andrews

[57] ABSTRACT

A computer includes a memory for storing the machine instructions therein and an arithmetic logic unit for carrying out logical and arithmetic operations. An instruction processing unit is provided for receiving and decoding machine instructions which are received from the memory. The instruction processing unit produces an entry address for the first microinstruction which corresponds to the machine instruction which was decoded by the instruction processing unit. A dispatch control store is connected to receive the entry address and further has stored therein the first microinstruction for each of the machine instructions. The dispatch control store produces a selected one of the microinstructions stored therein upon receipt of the entry address. A main control store is provided for storing therein all of the microinstructions for each of the machine instructions other than the first microinstruction for each of the machine instructions. Circuitry is provided for conveying the entry microinstruction corresponding to the entry address from the dispatch control store to the arithmetic logic unit and subsequently for conveying sequentially the remainder of the microinstructions from the control store to the arithmetic logic unit for decoded machine instruction.

5 Claims, 9 Drawing Sheets

MICROCODE COMPUTER HAVING DISPATCH AND MAIN CONTROL STORES FOR STORING THE FIRST AND THE REMAINING MICROINSTRUCTIONS OF MACHINE INSTRUCTIONS This application is a continuation, of application Ser. No. 622,634, filed 6/20/84, now abandoned.

TECHNICAL FIELD

The present invention pertains to the field of computer technology and in particular to such technology having high speed processing for both scalar and vector quantities.

BACKGROUND ART

A principle objective in the development of computer systems has been to design a computer to produce the maximum data processing per unit of cost. In terms of design, this has led to methods and hardware for increasing the speed of execution for instructions as well as for maximizing the throughput of data for the computer system as a whole.

Early designs of computers have processed data as scalar quantities but these computers have typically been limited by the machine cycle time required for executing each of the instructions. It has been recognized that many data processing applications utilize large blocks of data in which each of the elements of data is processed in a similar fashion. As a result of this recognition, there has been developed a class of computers which utilize a technique termed vector processing. An example of such a computer is shown in U.S. Pat. No. 4,128,880 to Cray, Jr.

Even though the technique of vector processing has substantially increased the rate for data processing, there continue to be demands for faster processing and increased throughput.

The present invention provides a computer which has many of its units operating in a pipelined fashion together with concurrent processing as well as other unique operating techniques to speed up instruction execution and enhance the overall data throughput rate.

SUMMARY OF THE INVENTION

A selected embodiment of the present invention is a microcode computer unit wherein each of a plurality of machine instructions is implemented by executing a corresponding series of microinstructions. The computer includes a memory for storing the machine instructions therein and an arithmetic logic unit for carrying out logical and arithmetic operations. An instruction processing unit is provided for receiving and decoding machine instructions which are received from the memory. The instruction processing unit produces an entry address for the first microinstruction which corresponds to the machine instruction which was decoded by the instruction processing unit. A dispatch control store is connected to receive the entry address and further has stored therein the first microinstruction for each of the machine instructions. The dispatch control store produces a selected one of the microinstructions stored therein upon receipt of the entry address. A main control store is provided for storing therein all of the microinstructions for each of the machine instructions other than the first microinstruction for each of the machine instructions. Circuitry is provided for conveying the entry microinstruction corresponding to the entry address from the dispatch control store to the arithmetic logic unit and subsequently for conveying sequentially the remainder of the microinstructions from the control store to the arithmetic logic unit for the decoded machine instruction. The microinstructions are executed by the arithmetic logic unit. Concurrently with the conveying of the entry address, an opcode can be transmitted to a vector control unit wherein the entry address and opcode are produced by the same machine instruction. Further circuitry is provided for transferring operands between the memory and the arithmetic logic unit.

BRIEF DESCRIPTION OF THE DRAWINGS

For a more complete understanding of the present invention and the advantages thereof, reference is now made to the following detailed description taken in conjunction with the following drawings in which.

DETAILED DESCRIPTION

Various aspects related to the present invention are described in copending applications which are assigned to the assignee of the present application. These applications are:

(1) Physical Cache Unit for Computer filed 6-20-84, Ser. No. 622,562, now U.S. Pat. No. 4,646,233.
(2) Instruction Processing Unit for Computer filed 6-20-84, Ser. No. 622,728, now abandoned.
(3) Input/Output Processor for Computer filed 6-20-84, Ser. No. 622,445, now abandoned.
(4) Input/Output Bus or Computer filed 6-20-84, Ser. No. 622,561.

Figure 1A:
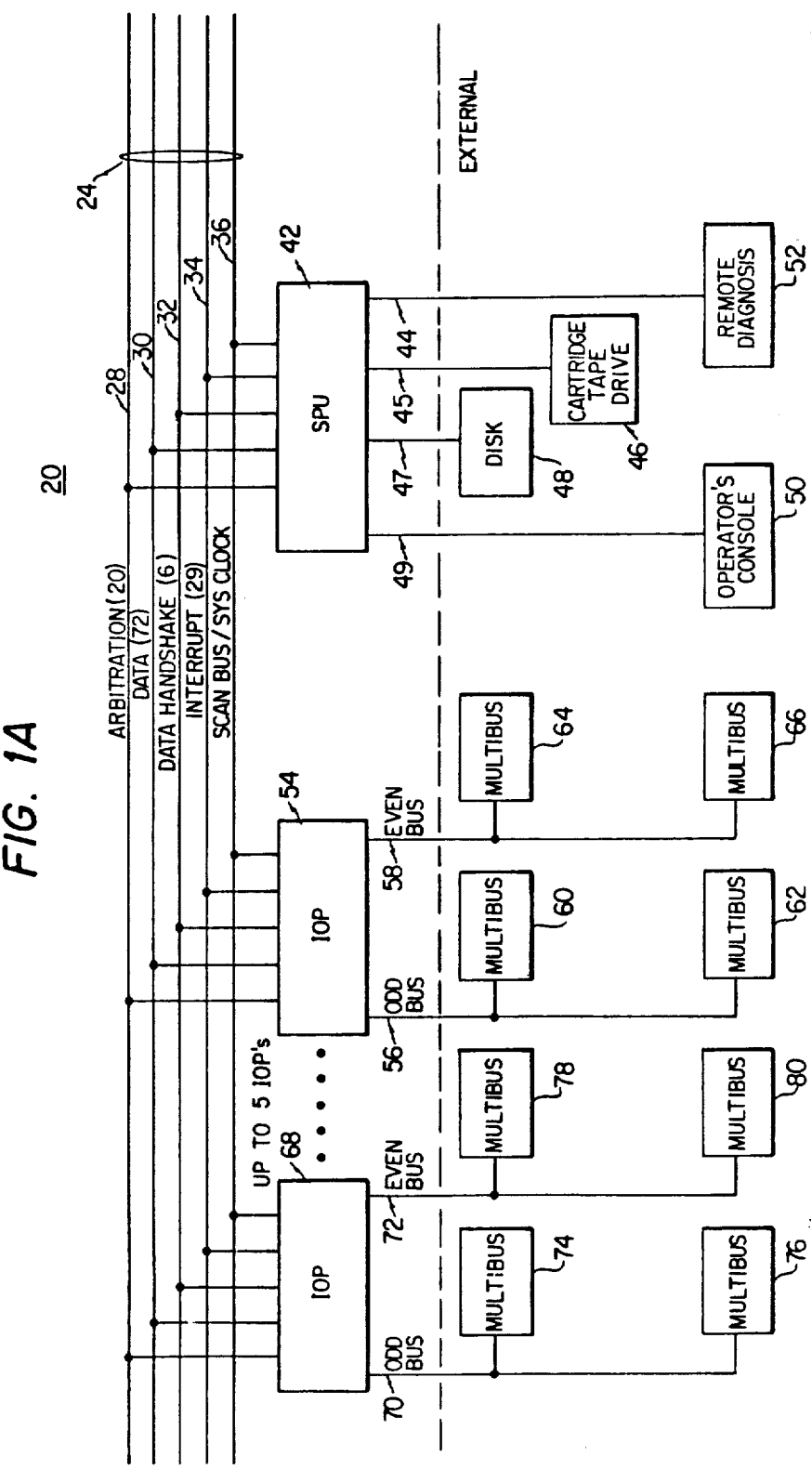
FIGS. 1A and 1B are overall block diagrams illustrating the functional units of the computer of the present invention and the data flow between the functional units.
Figure 1B:
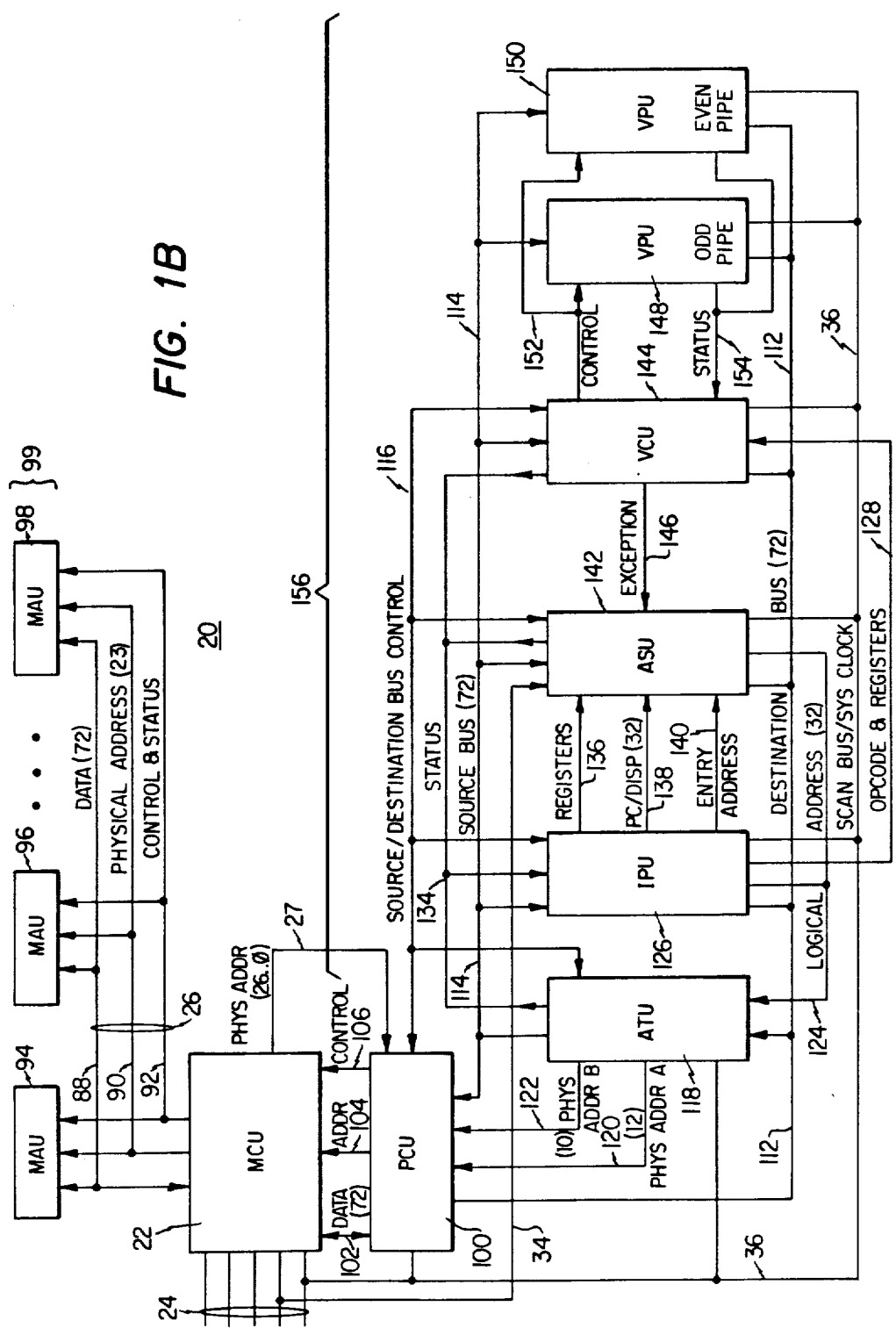

The present invention is utilized in a computer which is designed to maximize data throughput and accelerate data processing in numerous aspects. Referring now to FIGS. 1A and 1B, there is illustrated a functional block diagram for a vector processing computer which is referred to by the reference numeral 20. In a first step of the description, each of the functional blocks is defined together with the basic operand and control flow between the functional blocks. This is followed by an operational description of the computer 20 in reference to the overall block diagram Following the operational description there is a detailed configuration and operational description for each of the functional units of the computer 20.

The computer 20 has a hierarchical memory in which operands and instructions are identified at the execution level by logical addresses which cover the full range of addresses used within the application program. However, in many instances the actual memory in use is substantially smaller than the range of logical addresses used in the application program. The addresses used by the main memory and certain caches within the computer 20 are termed physical addresses. Since the logical addresses cover a greater span than the physical addresses, the logical addresses will have a greater number of bits to define the address. As described herein there is frequently a requirement to translate logical addresses into corresponding physical addresses. The method of translation and units involved in such translation are described below.

The central element for data flow through the computer 20 is a memory control unit (MCU) 22. A multi-line bus 24 (PBUS) is connected for transmitting and receiving operands, control and other signals with the memory control unit 22. A second multi-line bus 26 (MBUS) is also connected to the memory control unit 22.

Bus 24 comprises a plurality of lines including an arbitration line 28 (20 bits), a data line 30 (72 bits), a handshake line 32 (6 bits), an interrupt line 34 (29 bits) and a scan bus/system clock line 36. Even though the figures herein show a single line, each line may comprise a plurality of parallel paths, such as 20 parallel paths for the arbitration line 28.

A service processing unit (SPU) 42 is connected in parallel with each of the lines comprising bus 24. The service processing unit 42 is connected to several units of peripheral equipment which are external to the computer 20. These include a cartridge tape drive 46 connected through a line 45 and a disk 48 connected through a line 47. Through RS232 interface lines 49 and 44 there are connected an operator's console 50 and a remote diagnosis unit At least one input/output processor (IOP) 54 is connected in parallel to the bus 24. The input/output processor 54 provides a plurality of input and output data paths for connecting the computer 20 to user devices such as disk and tape bulk storage. The input/output processor 54 has an odd bus 56 and an even bus 58. For each of these buses there may be connected thereto a plurality of standard multibus units such as 60 and 62 which are connected to the odd bus 56 and units 64 and 66 which are connected to the even bus 58.

In the system configuration of the computer 20 there may be connected up to, for example, five input/output processors similar to the processor 54 A second such input/output processor is shown by reference numeral 68 having an odd bus 70 and an even bus 72. Multibus units 74 and 76 are connected to the odd bus 70 while multibus units 78 and 80 are connected to the even bus 72.

The bus 26 comprises a plurality of lines including a data line 88 (72 bits), a physical address line 90 (23 bits) and a control and status line 92. The 72 bits for data line 88 comprise 64 bits for operands and 8 bits for parity and error control. The bus 24 serves to connect the memory control unit 22 to at least one memory array unit 94. Additional memory array units, such as 96 and 98, may be connected in parallel to the bus 26. A selected embodiment of the computer 20 requires a minimum of one memory array unit and can utilize as many as 8 memory array units. The set of memory array units 94, 96 and 98 comprises a main memory 99 for the computer 20.

The computer 20 further includes a physical cache unit (PCU) 100 which is connected to the memory control unit 22 through a data line 102 (72 bits), an address line 104 and a control line 106. The physical cache unit 100 serves principally as a high speed cache memory. The physical cache unit 100 transmits operands to and receives operands from the main memory 99 via the memory control unit 22. Operands are also transmitted from the physical cache unit 100 through a destination bus 112 (72 bits) to a source bus 114 (72 bits) which is also connected to transfer operations into the physical cache unit 100. Control signals for regulating the flow of operands through the source and destination buses is transmitted through a bidirectional source/destination bus control line 116 which is connected to the physical cache unit 100.

Physical addresses are transmitted from the memory control unit 22 through a line 27 to the physical cache unit 100.

An address translation unit (ATU) 118 is connected to both receive operands through the destination bus 112 and transfer operands to the source bus 114. The address translation unit 118 produces two physical addresses which are transmitted through a physical address A line 120 (12 bits) and through a physical address B line 122 (10 bits). Both of the lines 120 and 122 are connected to provide physical addresses to the physical cache unit 100. The address translation unit 118 is further connected to the source/destination bus control line 116. Logical addresses are provided to the address translation unit 118 via a logical address bus 124 (32 bits).

An instruction processing unit (IPU) 126 is connected to both the destination bus 112 and the source bus 114. For control purposes the instruction processing unit 126 is further connected to the source/destination bus control bus 116. Logical addresses generated by the instruction processing unit 126 are transmitted through the logical address bus 124. The instruction processing unit 126 produces opcode instructions together with register information which is transmitted through an opcode and registers bus 128. Status information is provided to the instruction processing unit 126 through a status bus 134.

The instruction processing unit 126 further produces register information which is transmitted through a registers line 136, produces a program count (PC) and program count displacement information which is transmitted through a PC/DISP line 138 (32 bits) and produces an entry address which is transmitted through entry address line 140.

An address scalar unit (ASU) 142 principally serves to execute scalar instructions, control vector length and vector stride manipulation, and generate logical addresses. The lines 136, 138 and 140 from the instruction processing unit 126 are inputs to the address scalar unit 142. Both the destination bus 112 and the source bus 114 are connected to the address scalar unit 142. Interrupt information is further transmitted and received by the address scalar unit 142 through the interrupt line 34. Control information for the source and destination buses is conveyed to and from the address scalar unit 142 through the source/destination bus control line 116.

The address scalar unit 142 further generates status information which is transmitted through the status line 134.

In response to one instruction, the instruction processing unit 126 can produce register instructions and an entry address for the address scalar unit 142 together with opcode and register information for the vector control unit (described below).

A vector control unit (VCU) 144 is connected to both the destination bus 112 and the source bus 114 as well as the source/destination bus control bus 116. The vector control unit 144 receives opcode information and register assignments through line 128 from the instruction processing unit 126. The vector control unit 144 further generates status information which is transmitted through the status line 134. When certain processing problems arise within the vector control unit 144, such as a floating point overflow, an exception command is generated and transmitted through an exception line 146 to the address scalar unit 142.

The high speed vector processing of data is carried out in the computer 20 by use of identical vector processing units (VPU) 148 and 150. Unit 148 is termed the odd pipe and unit 150 is termed the even pipe. A vector processing unit appropriate for use in the present invention is described in *The Architecture of Piplined Computers*, Peter M. Kogge, McGraw-Hill Book Company, copyright 1981. Both the destination bus 112 and the source bus 114 are connected to the vector processing units 148 and 150 for receiving and transmitting operands. The vector control unit 144 produces control commands which are transmitted through a control line 152 to both of the vector processing units 148 and 150. Status information is produced by both of the units 148 and 150 and the status information is transmitted through a status line 154 to the vector control unit 144.

The scan bus/system clock line 36 originates in the service processing unit 42 and extends for connection to each of the input/output processors, such as 54 and 68, the memory control unit 22, the physical cache unit 100, the address translation unit 118, the instruction processing unit 126, the address scalar unit 142, the vector control unit 144, and the vector processing units 148 and 150. The service processing unit 42 transmits the system clock through line 36 to synchronize the operation of each of the units in computer 20. Unit 42 also operates through line 36 to diagnose the operation of each of the units connected to line 36.

The collection of units comprising the address translation unit 118, the instruction processing unit 126, the address scalar unit 142, the vector control unit 144 and the vector processing units 148 and 150 is termed the central processor for the computer 20 and is designated by the reference numeral 156. However, a data cache located in the address translation unit 118 serves as a memory and is therefore not necessarily a part of the central processor 156.

The basic operation of the computer 20 is now described in reference to FIGS. 1A and 1B. Following this overall description, the physical configuration and function is described for each of the units within the computer 20.

The first step in the operation of the computer 20 is termed initialization. When power is first turned on, there is no valid data or instructions in any of the memory locations or registers of the computer 20.

The initialization of the computer 20 is carried out by the service processor unit 42. In a first step, the various registers and status bits throughout the computer 20 are set to an initial state to eliminate the random state that occurs during power-up.

In the next step, a command is input through the operator's console 50 to transfer the operating system for the central processor 156 from the disk 48 or cartridge tape drive 46 into the main memory 99 which includes the memory array units 94, 96 and 98. The operating system travels from the disk 48, or cartridge tape drive 46, through the service processing unit 42, the bus 24 and the memory control unit 22 into the main memory 99.

As a further part of the initialization, microcode is loaded into random access memory (RAM) in various control stores within the central processor 156, specifically into control stores in the address scalar unit 142 and the vector control unit 144. After the initialization and the loading of the operating system, the service processing unit 42 initiates instruction execution in the central processor 156. This is accomplished by setting the program counter, which is within the instruction processing unit 126, to a preselected program count. This starts the program execution.

As the first step, the instruction processing unit 126 seeks the first instruction to execute. An instruction cache, described in further detail below, is provided within the instruction processing unit 126. Since the instruction is not in this cache, because the computer 20 has just been initialized, a request must be made to main memory 99 for the instruction. The instruction processing unit 126 generates a request to main memory by supplying a logical address over the logical address bus 124. The logical address produced by unit 126 is transmitted via bus 124 to the address translation unit 118 which produces the corresponding physical address. The resulting physical address is transmitted through, line 120 to the physical cache unit 100. If the requested instruction at the specified physical address is not within the physical cache unit 100, the physical address is passed through line 104 to the memory control unit 22. The physical address is then passed to the main memory 99 where the desired instruction is retrieved, typically within a block of instructions, and passed through the data line 88, the memory control unit 22, line 102, and to the physical cache unit 100. The block of instructions thus produced are passed through the physical cache unit 100, the destination bus 112, through the address translation unit 118 to the source bus 114. From bus 114 the instructions are delivered to the instruction processing unit 126 where the requested instructions are stored within an instruction cache. The desired instruction can then be decoded where it initiates either the address scalar unit 142 or the vector control unit 144 or both to carry out the steps of the selected instruction.

The above example is typical for the fetching of an instruction. A description is now presented for the execution of a load scalar instruction. The primary decoding is carried out by the instruction processing unit 126. As a result of the decoding, register information concerning the use of the registers within the address scalar unit 142 is transmitted over the registers line 136. The load instruction requires retrieving information from either main memory 99 or physical cache unit 100 or a logical cache within unit 126. A logical address is generated by the address scalar unit 142. This address may be the contents of an "A" register, the contents of an instruction stream literal, or may be the arithmetic sum of the two. A logical address is directed from the instruction processing unit 126 through the logical address bus 124 to the address translation unit 118 which produces a corresponding physical address. The physical address is transferred through lines 120 or 122 to the physical cache unit 100. During a clock cycle in which the logical address is being translated to a physical address and transferred to the physical cache unit 100, a logical cache in the instruction processing unit 126 is accessed. The logical cache is further described below. If the logical cache contains the requested operand then that operand, is transferred to the address scalar unit 142 during the clock cycle in which the logical to physical translation occurs, and the physical memory request is aborted. If the operand is not contained within the logical cache and operands for the requested address are stored within the physical cache unit 100, they are immediately retrieve from the physical cache unit 100 and transmitted through the destination bus 112, through the address translation unit 118 to the source bus 114 for delivery to the address scalar unit 142 into the selected registers. If the requested data is not in the physical cache unit 100, the physical address is passed through the memory control unit 22 to the main memory 99 where the desired operands are read and returned through the memory control unit 22, the physical cache unit 100 to the destination bus 112, through the address translation unit 118 to the source bus 114 for delivery to the address scalar unit 142. Within the address scalar unit 142, the retrieved information is processed as required by the executed instruction.

Figure 2:
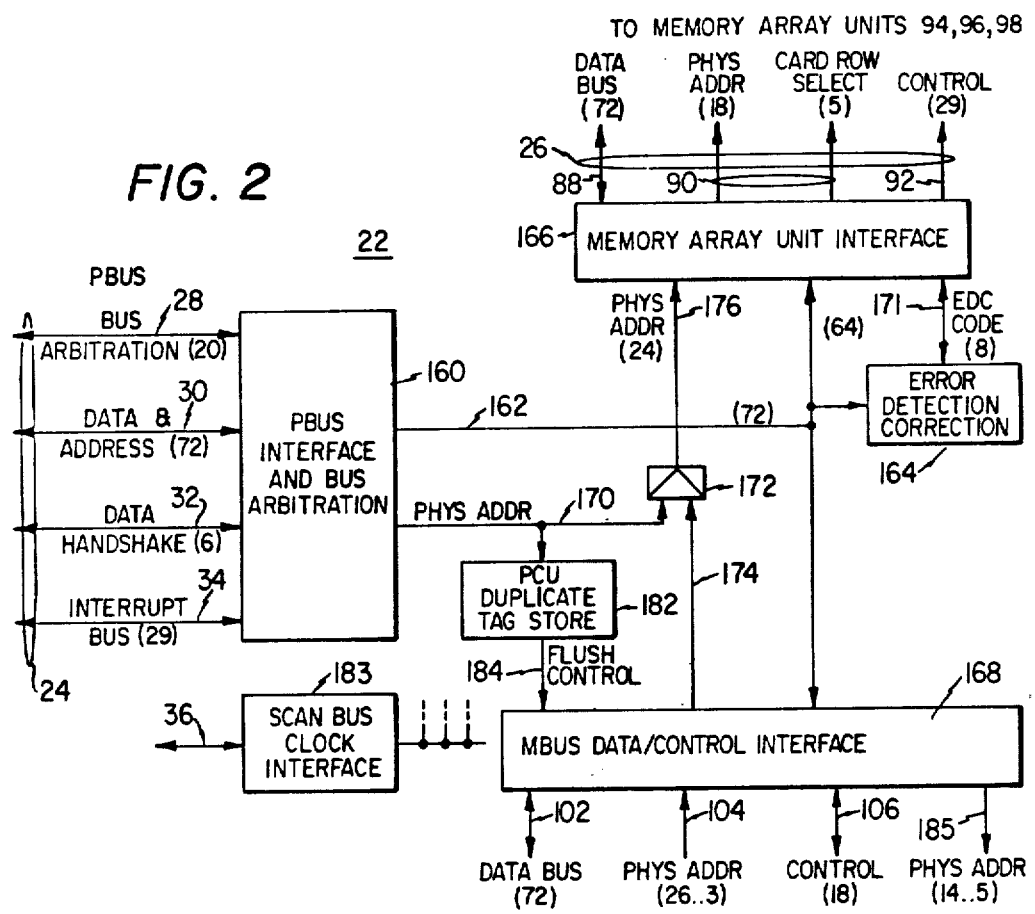
FIG. 2 is a block diagram illustrating the memory control unit (MCU) shown in FIG. 1B.

Referring to FIG. 2, there is illustrated a detailed block diagram of the memory control unit 22, which is shown in FIG. 1B. The bus 24 is connected to a PBUS and bus arbitration unit 160. Unit 160 provides the arbitration to determine which of the I/O processors and service processing unit 42 on the bus 24 can utilize the services of the bus. Operands input to the unit 160 are transmitted through a line 162 to an error detection and correction circuit 164, to a memory array unit interface 166 and to an MBUS data/control interface 168.

The error detection and correction circuit 164 is further connected through an error detection code (EDC) line 171 to the memory array unit interface 166. Operands that are sent to the main memory 99 through the memory control unit 22 and received from the main memory 99 are error checked and appropriately corrected by unit 164. Such error detection and correction is well known in the art.

The data transmitted and received by line 30 is passed through line 162 within the memory control unit 22. Physical addresses transmitted and received through the line 30 are passed through the unit 160 to a physical address line 170. A switch 172 is connected to receive physical addresses from line 170 or a line 174 from the interface 168. A selected one of the inputs to the switch 172 is routed to a physical address line 176 (24 bits) which is then input to the memory array unit interface 166. A physical address transmitted through line 104 to the interface 168 is passed to the physical address line 174.

The memory control unit 22 further includes a PCU duplicate tag store 182. If a physical address received through line 170 corresponds to a tag index within the store 182, the physical address is passed through a flush control line 184 to the interface 168. The physical address is then passed to the physical cache unit 100 via line 185.

The physical address line 90 comprises two lines in FIG. 2. These are a physical address line (18 bits) and a card select line (5 bits).

One of the features which enhances the throughput for the computer 20 is the inclusion of the PCU duplicate tag store 182 within the memory control unit 22. When a request to access a memory location is received over the bus 24, the memory control unit 22 initially makes a comparison between the received physical address and the stored tag indexes in the PCU duplicate tag store 182. The unit 182 is a storage unit which contains a collection of tag indexes that corresponds to the stored tag indexes in the physical cache unit 100, further described below. Thus, the unit 182 provides a directory showing the information that is stored in the physical cache unit 100.

If the physical address received by the memory control unit 22 corresponds to one of the tag indexes within the store 182, a flush control command at line 184 is sent to the physical cache unit 100 to read and flush the cache block at the requested address from its store and return it via line 102 to the memory control unit 22 to flush the block which contains the requested operand back to the main memory 99. The resulting operand is then transmitted via line 162 to the data and address line 30 within the bus 24 for delivery to the appropriate IOP. This operation has numerous advantages. First, the operands stored in the physical cache unit 100 are those which have most recently been produced and therefore could be more current than those at the corresponding address in main memory 99. Thus, the requester, typically an IOP is provided with the most recently updated information which may be different than that in the main memory 99. A second advantage is that the retrieval of operands from the physical cache unit 100 is substantially faster than retrieving a corresponding operand from the main memory 99. Thus, a response can be provided to the requester in much less time. In addition, the main memory 99 is free for other operations. A third advantage is that the physical cache unit 100 is involved in I/O requests only when there is an I/O request over bus 24 to encached operands. The duplicate tag store 182, in the memory control unit 22, is used for this purpose and monitors I/O requests to determine if a requested operand is in the physical cache unit 100.

When a physical address received from bus 24 by the memory control unit 22 is successfully correlated with an index tag in the store 182 and the requested information is retrieved from the physical cache unit 100, the resulting operands are flushed through the memory control unit 22 to the memory array units for storage in the main memory 99. Thus, each time that there is a successful access from a requester through the memory control unit 22 to the physical cache unit 100, the main memory 99 is also updated.

If the physical address received from the bus 24 is not correlated in the PCU duplicate tag store 182, the physical address is passed through switch 172 to the memory array unit interface 166 so that a conventional memory read operation is carried out in the main memory 99. When the selected address is read, the resulting operands are passed through line 88 back to the interface 166, through line 162 and back to the data and address line 30 for return to the requesting IOP.

The memory control unit 22 further includes a scan bus clock interface 183 which is connected to the scan bus/system clock line 36. The interface 183 receives the system clock, initialization commands and diagnostic commands from the service processing unit 42.

Figure 3:
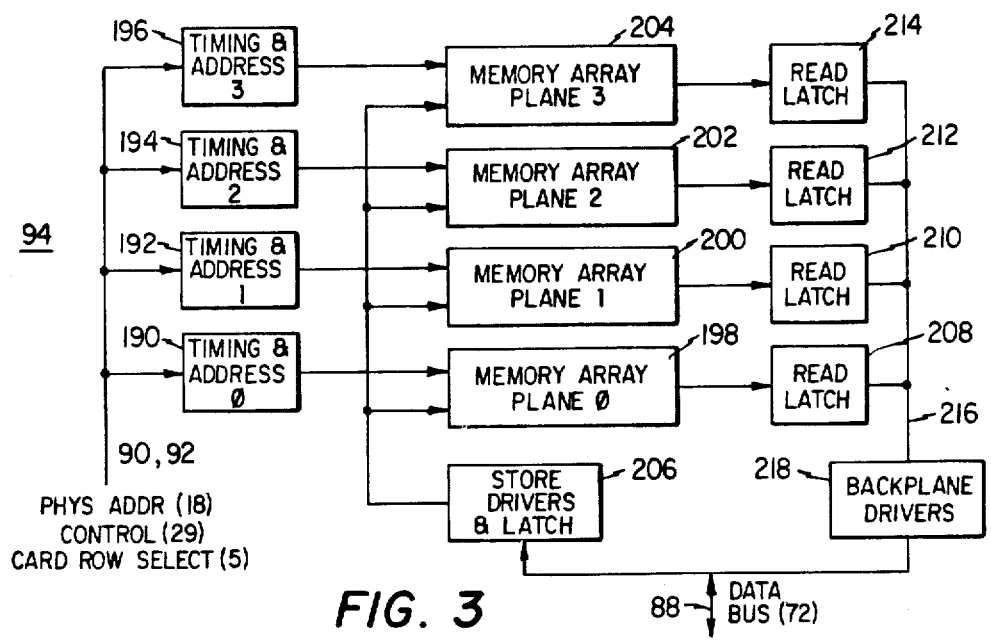
FIG. 3 is a block diagram illustrating the memory array unit (MAU) shown in FIG. 1B.

Referring now to FIG. 3, there is illustrated a detailed diagram of the memory array unit 94 shown in FIG. 1B. Buses 90 and 92 are connected to each of a group of four timing and address units 190, 192, 194 and 196. The memory storage on the memory array unit 94 is divided into four memory array planes 198, 200, 202 and 204. The timing and address units 190, 192, 194 and 196 are connected, respectively, to the memory array planes 198, 200, 202 and 204. The data line 88 carries operands bidirectionally for both reading data from and writing data to the memory array unit 94. The line 88 is connected to transfer operands to a store drivers and latch 206 which is in turn connected as an input to each of the memory array planes 198, 200, 202 and 204. A plurality of read latches 208, 210, 212 and 214 are connected, respectively, to the outputs of the memory array planes 198, 200, 202 and 204. The outputs from the read laches 208, 210, 212, 214 are connected through a common bus 216 to backplane drivers 218, which is in turn connected to deliver operands, which were read from the memory arrays, to the data line 88.

The memory array unit 94 utilizes a technique termed interleaving. This technique permits a plurality of memory requests to be carried out sequentially to produce outputs in substantially less time than required for the sum of individual read operations. For example, a typical access time for one plane is 400 nanoseconds. But if all four planes are working concurrently, the first operand is produced in 400 nanoseconds but each succeeding operand is produced 100 nanoseconds later. The memory array 94 further has a capability of producing a desired word first. This means that any of the memory array planes 198, 200, 202, 204 can be accessed in any order so that the desired word, within the selected block, is the first word to be produced. Thus, the 4-way interleaving can begin at any one of the 4 words which are being read from the main memory 99. The sequence of reading the words can be any one of the following: 0123, 1230, 2301, 3012. Where, for example, 0123 means word 0 followed by word 1, followed by word 2, and finally followed by word 3. The stride (defined as the address distance between words) between elements can also be negative to produce any of the following sequences: 3210, 2103, 1032 and 0312.

Figure 4:
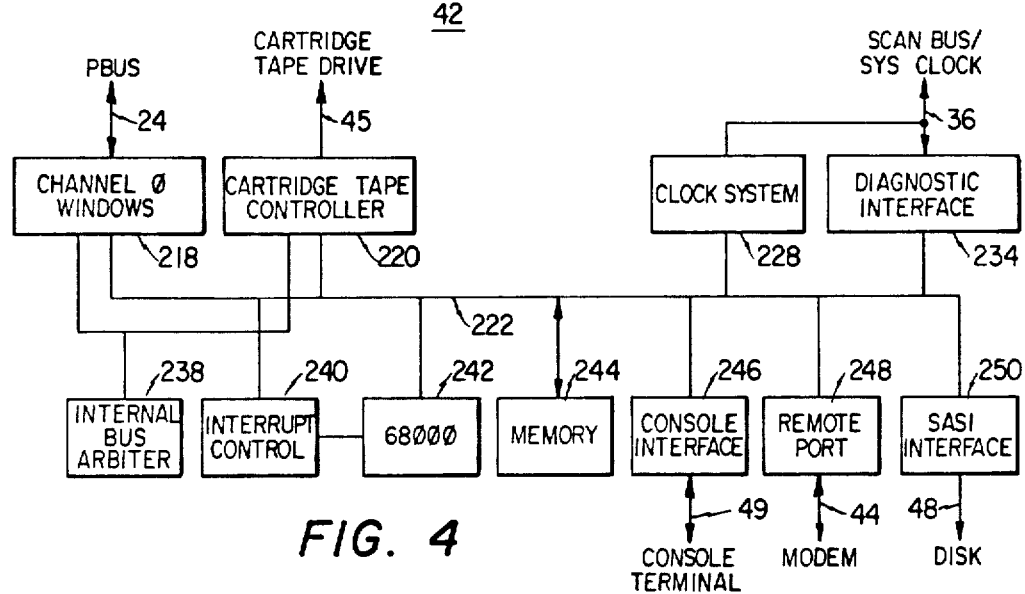
FIG. 4 is a block diagram illustrating the service processing unit (SPU) shown in FIG. 1A.

Referring to FIG. 4, there is illustrated a detailed block diagram of the service processing unit 42, which is shown in FIG. 1A. The service processing unit 42 is basically an independent microcomputer based on the Motorola 68000 or equivalent. The service processing unit 42 is connected to the bus 24 through an interface 218 termed channel 0 windows. Interface 218 provides the connection and channel identification for the service processing unit 42 on the bus 24. There is further included a cartridge tape controller 220 which is connected through the line 45 to the cartridge tape drive 46.

The service processing unit 42 has an internal bus 222 for transmitting operands between the various elements of the unit. Both the interface 218 and the controller 220 are connected to the internal bus 222.

The service processing unit 42 provides the clock signals for synchronous operation of the entire computer 20. A clock system 228 is included within the unit 42 for producing the clock signals which are distributed through the line 36 within the bus 24.

A further function of the service processing unit 42 is to provide diagnostics for each of the units within the computer 20. This diagnostic function is carried out through a diagnostic interface 234 which is also connected to the internal bus 222. The diagnostic interface 234 is connected through line 36 which is connected to each of the other functional units of the computer 20 for the purpose of performing diagnostic checks on those elements.

The unit 42 further includes an internal bus arbiter 238 which controls the flow of operands through the internal bus 222. The bus arbiter 238 is further connected to the interface 218 and the cartridge tape controller 220. The bus arbiter 238 arbitrates among all the possible requesters for use of the internal bus 222. Since there can only be one sender and one receiver, the arbiter 238 decides among simultaneous requests.

The unit 42 includes an interrupt control 240 and a Motorola 68000 microprocessor 242. The interrupt control 240 controls external interrupts that are received through bus 222 and input to the microprocessor 242. A memory 244 for the unit 42 is connected to the internal bus 222. A console interface 246 connects the unit 42 to the operator's console 50 through a line 49. A remote port 248 works through the line 44 to the remote diagnostic unit 52 for providing, by operation of a modem, remote diagnostics for the computer 20. And finally, the service processing unit 42 includes a SASI (Shugart ANSI Standard Interface) interface 250 which manages data transfer between the service processor unit 42 and the disk 48. ANSI is an abbreviation for American National Standards Institute.

Figure 5:
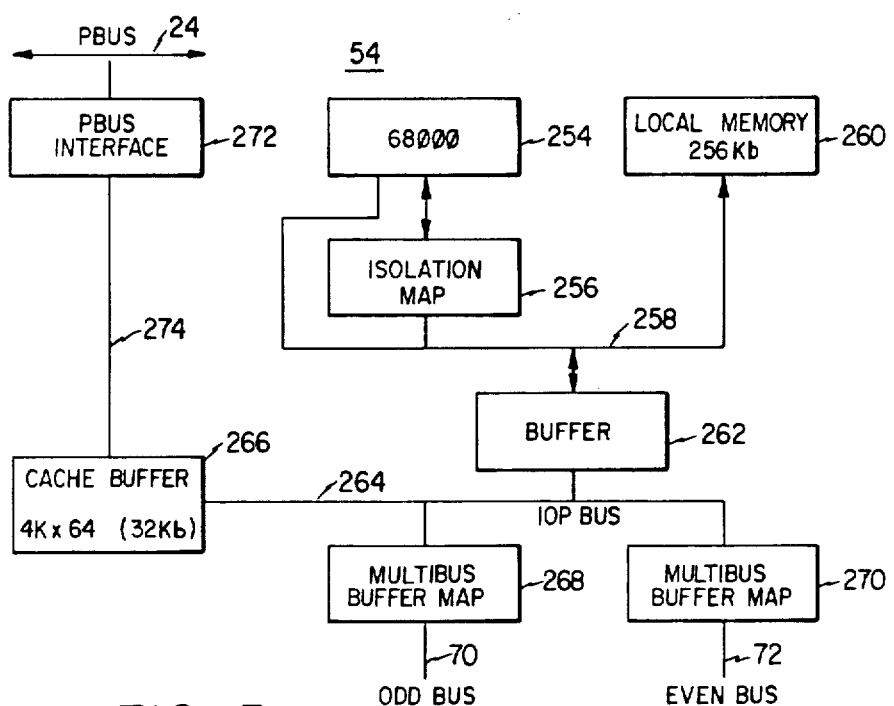
FIG. 5 is a block diagram illustrating the input/output processor (IOP) shown in FIG. 1A.

Referring now to FIG. 5, there is illustrated a detailed block diagram of the input/output processor 54 which is shown in FIG. 1A. The primary function of the input/output processor 54 is to service the multibus units 60, 62, 64 and 66. The multibus interface is an industry standard which is described in Intel Multibus Specification, Order Number 9800683-04, 182, Santa Clara, Calif. 95051 and also known as IEEE standard p-796. Many types of equipment, including peripheral devices such as disk drives and tape units, utilize the multibus interface as a standard. Each of the multibus units 60, 62,64 and 66 comprises a card cage and each card cage can have up to 8 multibus controllers (not shown). Therefore, for one input/output processor, such as 54, there can be many peripheral controllers connected by means of the multibus interface. Each controller, in turn, can generally manage multiple devices of the same type. For example, one disk controller can be used to connect up to 4 disk drives.

Like the service processing unit 42, the input/output processor 54 is based on a Motorola 68000 or equivalent microcomputer 254. An isolation map 256 is connected between the microcomputer 254 and an internal bus 258. A local memory 260 is used for the operation of the input/output processor 54 and specifically for the microcomputer 254. A buffer 262 serves as a buffer storage between the internal bus 258 and an input/output bus 264. The bus 264 conveys operands between a cache buffer 266, multibus buffer maps 268 and 270 and the buffer 262. Buffer 262 conveys data either to the 68000 microprocessor 254 or local memory 260. The multibus buffer maps 268 and 270 are respectively connected to the odd and even buses 70 and 72. The multibus buffer maps 268 and 270 serve to route the operands to the appropriate destination, either the Motorola 68000 microcomputer 254, buffer 262 or the bus 24 via cache buffer 266, a bus 274, and a PBUS interface 272.

The bus 24 is connected to the input/output processor 54 through the PBUS interface 272 to the bus 274 which is in turn connected to the cache buffer 266. The buses 24 and 274 use a format which is 64 bits plus 8 bits parity. The bus 264, as well as the buses 70 and 72, transmit data as 16 bits. The cache buffer 266 serves to interface between these two bus formats. Operands received from the bus 24 as 64 bit units are divided into four 16 bit units for transmission through bus 264. The operands that are received from bus 264 are collected in four 16 bit units to produce a 64 bit word for transmission through bus 274 to the bus 24.

Figure 6:
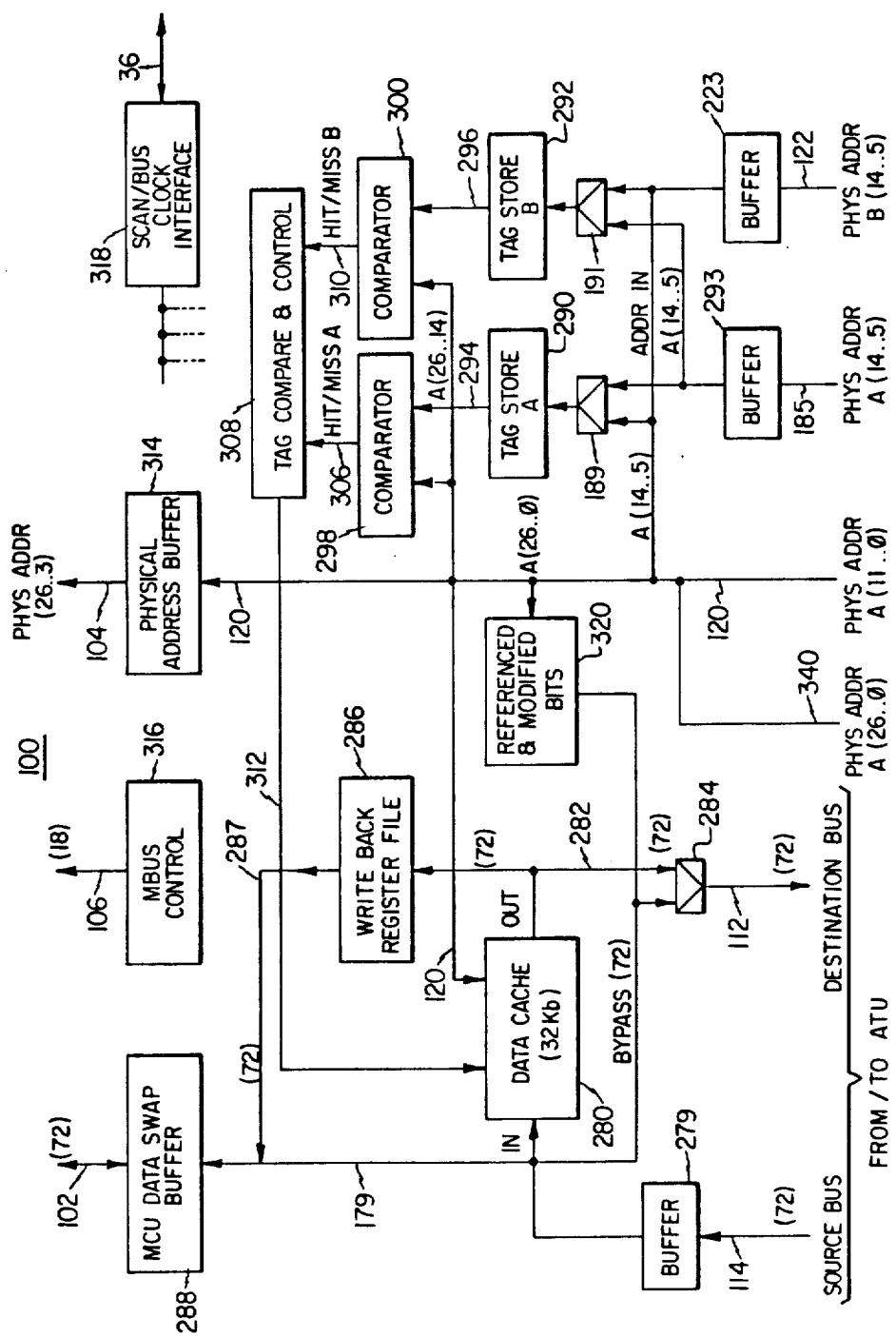
FIG. 6 is a block diagram illustrating the physical cache unit (PCU) shown in FIG. 1B.

The physical cache unit 100, shown in FIG. 1B, is described in a detailed block diagram in FIG. 6. The source bus 114 is connected to transfer operands through a buffer 279 and a bus 179 into a data cache 280. Cache 180 comprises two independently operable 16Kb caches for a total capacity of 32Kb. The output from the cache 280 is transmitted through a bus 282 to the first input of a switch 284. The second input to the switch 284 is connected to the bus 179. The output of the switch 284 is connected to supply operands to the destination bus 112. A write back register file 286 is connected between the bus 282 and a unidirectional bus (72 bits) 287. When a cache reference causes a block to be loaded into the cache 280, and the cache location to be loaded already contains other data which has never been written to main memory 99, that other data is moved from cache 280 to the write back register file 286 while the new data is being read from main memory 99 and is subsequently transferred through line 102 and the memory control unit 22 for writing into the main memory 99.

The data cache 280 is provided with a 15 bit address through line 120 for addressing the full 32Kb of memory. However either of the 16Kb sections can be deallocated, such as a result of hardware failure, so that the computer 20 can function with a 16Kb data cache. This feature can also be used for diagnostic purposes.

An MCU data swap buffer 288 is connected to send and receive operands with the bus 102 which is connected to the memory control unit 22 and to transmit and receive operands to the bus 179. The purpose of the MCU data swap buffer 288 is two fold: (a) provide a connection from the bidirectional us 102 to the bidirectional bus 179 and (b) rotate non-aligned longwords by swapping halves of 64 bits. (A longword herein is defined as 64 bits, a word is 32 bits and a byte is 8 bits.)

Physical address A line 120 (11..0) is connected to the first inputs of switches 189 and 191. The line 185 (14..5) provides address bits to a buffer 293 which is connected to second inputs of the switches 189 and 191. Lines 340 and 120 together comprise line 27 (26..0) which provides addresses from the memory control unit 22 to the physical cache unit 100. Physical address B line 122 (14..51) is connected to a buffer 223 which is further connected to the first input of switch 191.

The switches 189 and 191 are connected respectively to the inputs of tag stores 290 and 292. Store 290 is labeled "A" and store 292 is labeled "B". The tag stores 290 and 292 are physically identical and contain the same stored tag indexes.

The physical address transmitted through lines 120 and 122 is divided into two sections termed tag and tag index. The tag index portion is input to the tag stores 290 and 292 to produce a tag which indicates the unique address for the data at the corresponding address in data cache 280. The tags produced by the stores 290 and 292 are transmitted respectively through lines 294 and 296 to comparators 298 and 300. The tag portion of the physical address, bits 26..14, is also input to the comparators 298 and 300. Within the comparator 298 the tag received through line 120 is compared to the tag produced by the store 290. If the two tags compare, there is produced a "hit" response which is transmitted through a line 306 to a tag compare and control unit 308. If the tags do not compare, it is deemed a "miss" and this response is also transmitted through line 306 to unit 308. Likewise, the comparator 300 compares the tag received through line 120 with the tag produced by store 292. A hit or miss response is transmitted through a line 310 to the tag compare and control unit 308. If a hit is produced by either of the comparators 298 or 300, a response is transmitted through a line 312 to the data cache 280. The tag index has previously been input to the data cache 280 from line 120. The data at the stored location of the tag index is read from the cache 280 and transmitted through bus 282, switch 284 to the destination bus 112 for delivery to the central processor 156.

The physical address A line 120 is further connected to a physical address buffer 314. If a miss is produced by the comparators 298 and 300, the physical address received through line 120 is stored in buffer 314 and then transmitted through line 104 to the memory control unit 22 to retrieve the desired operands from the main memory 99. The operands thus read from the main memory 99 are returned through the memory control unit 22 through the data bus 102 and directly routed through the buffer 288 and switch 284 to the destination bus 112 for delivery to the central processor 156 without storing the requested block in the cache 280 if there has been a vector request. At the same time, for scalar requests, the fetched operands are transferred into the data cache 280 for storage at the tag index location corresponding to the physical address which produced the operands. In previous data caches, the technique has been to return the operands into the data cache and then read them out of the data cache back to the central processor. However, by use of the direct bypass via line 179 into the switch 284, considerable time is saved thereby increasing the speed of retrieval when there is a miss in attempting to retrieve data from the cache 280.

The physical cache unit 100 further includes an MBUS control 316 which is connected to the control line 106 for monitoring the control and transfer of operands between the memory control unit 22 and the physical cache unit 100. A scan/bus clock interface 318 is connected to the scan bus/system clock line 36 to receive the system clock signal together with diagnostic commands produced by the service processing unit 42 for delivery to the units of the physical unit 100.

The physical cache unit 100 further includes a referenced and modified bits unit 320 which receives a physical address from line 120 and transfers operands to the internal bus 179. The purpose of unit 320 is to record read and write reference patterns as they apply to a pageframe. A pageframe is 4096 bytes stored in main memory. The operating system subsequently uses these bits to control page replacement algorithms which are used in virtual memory management.

The computer 20 is a synchronous machine which operates at a clock rate of preferably 100 nanoseconds for major cycles and 50 nanoseconds for minor cycles. The physical address A line 120 and physical address B line 122, during the same major cycle, input addresses to the tag stores 290 and 292. The data cache 280 is designed to operate at double the rate of the basic system clock, that is, at 50 nanoseconds. Since the tag stores 290 and 292 are operating in parallel and the cache 280 is operating at double the clock rate, there can be two sets of operands retrieved from the data cache 280 during each machine cycle. This substantially increases the rate of retrieving data from the physical cache unit 100. In a selected embodiment of the computer 20, two 32 bit words can be retrieved during each machine cycle (major cycle) and transmitted through the destination bus 112, therefore effectively having the capability of retrieving a 64 bit word during each major cycle. The production of the two operands is particularly advantageous with the use of the even and odd vector processing units 148 and 150, the operation of which is described further below.

Figure 7:
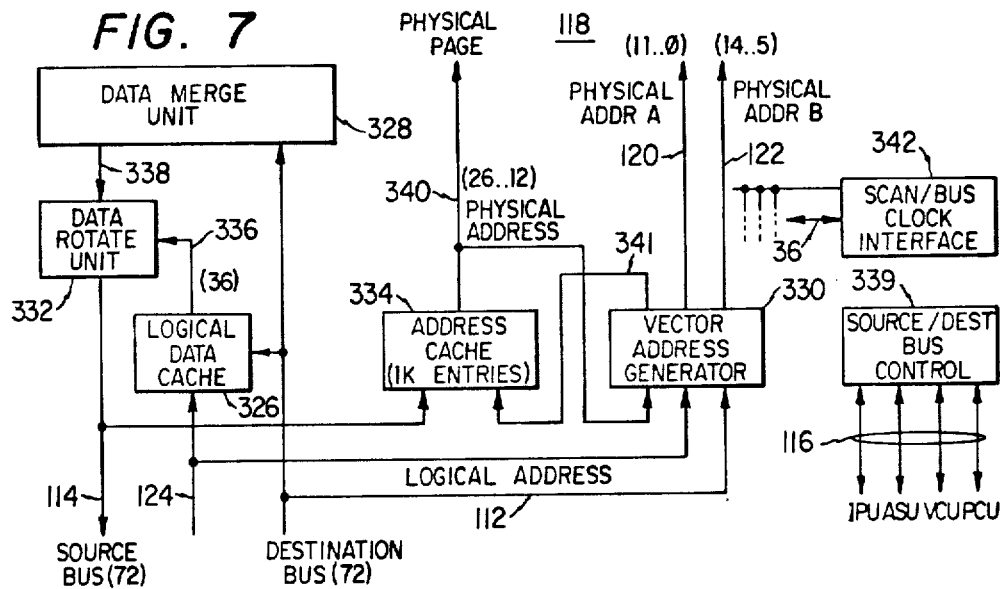
FIG. 7 is a block diagram illustrating the address translation unit (ATU) shown in FIG. 1B.

The address translation unit 118, shown in FIG. 1B, is illustrated in detail in FIG. 7. The address translation unit 118 has four major functions. These are to merge and rotate data, provide a logical data cache, provide an address cache and provide vector address generation with the last two functions involving the translation of logical to physical addresses.

The destination bus 112 is connected to provide operands to a logical data cache 326, a data merge unit 328 and to a vector address generator 330. The source bus 114 is connected to a data rotate unit 332 and an address cache 334. The logical data cache 326 is connected through a 36 bit line 336 to an input of the data rotate unit 332. The output of the data merge unit 328 is connected through a line 338 to an input of the data rotate unit 332.

The logical address bus 124 is connected to provide logical addresses to the logical data cache 326 and the vector address generator 330.

The vector address generator 330 extracts a segment of the logical address provided thereto and transmits received address segments alternatively through physical address A line 120 and physical address B line 122. The address segments transmitted through lines 120 and 122 are termed physical offsets. A portion of the logical address termed page number is extracted by the vector address generator 330 and transmitted through a line 341 to the address cache 334. The address cache makes a one to one translation between the logical page number extracted from the logical address and the physical page number in a physical address. If the address cache 334 contains the desired information, a translation can be made and the resulting physical page number is transmitted through a line 340 to within the physical cache unit 100.

The address translation unit 118 further includes a source/destination bus control 339 which is connected to bus 116 for monitoring and regulating the flow of operands through the destination bus 112 and source bus 114. The unit 118 further includes a scan/bus clock interface 342 which receives the system clock and diagnostic commands via line 36 from the service processing unit 42 and is connected to the various parts of unit 118.

The logical data cache 326 provides substantially increased processing speed for the retrieval of operands. It has heretofore been the practice in computers which utilize cache memories and virtual memory systems to operate the cache memory by means of the same physical addresses which are used by the main memory. This approach, however, has the limitation that each logical address must go through a translation into a physical address before the desired operands can be retrieved from the cache memory. There is included within the address translation unit 118 of the present invention the logical data cache 326 which serves to store and retrieve operands on the basis of logical rather than physical addresses. Therefore, there is no requirement for translation of addresses before the operands can be retrieved from the data cache 326. This further adds to the processing speed of the computer 20 of the present invention.

The data merge unit 328 serves to combine sections of a desired operand which are included within two different words. The sections are merged together and passed through line 338 to the data rotate unit which shifts the bits of the merged word until the desired operand is at the desired position within the word. The resulting merged and shifted word is then transmitted to the source bus 114.

The vector address generator 330 serves to generate a series of addresses corresponding to the elements of a selected vector. The vector may have, for example, 50 elements. The initial address of the vector is transmitted through the logical address bus 124 to the address cache 334 and then to vector address generator 330. The physical address of the initial address is stored in the vector address generator 330. The number of elements and the address offset between the elements, termed the stride, are maintained in the vector generator 330. The vector stride and vector length were previously stored in the vector address generator 330 by the previous execution of explicit programmer instruction. Vector stride is defined as the address difference between consecutive elements of a vector. After receiving this information, the vector address generator 330 sequentially generates each of the required addresses alternating between lines 120 and 122.

Figure 8:
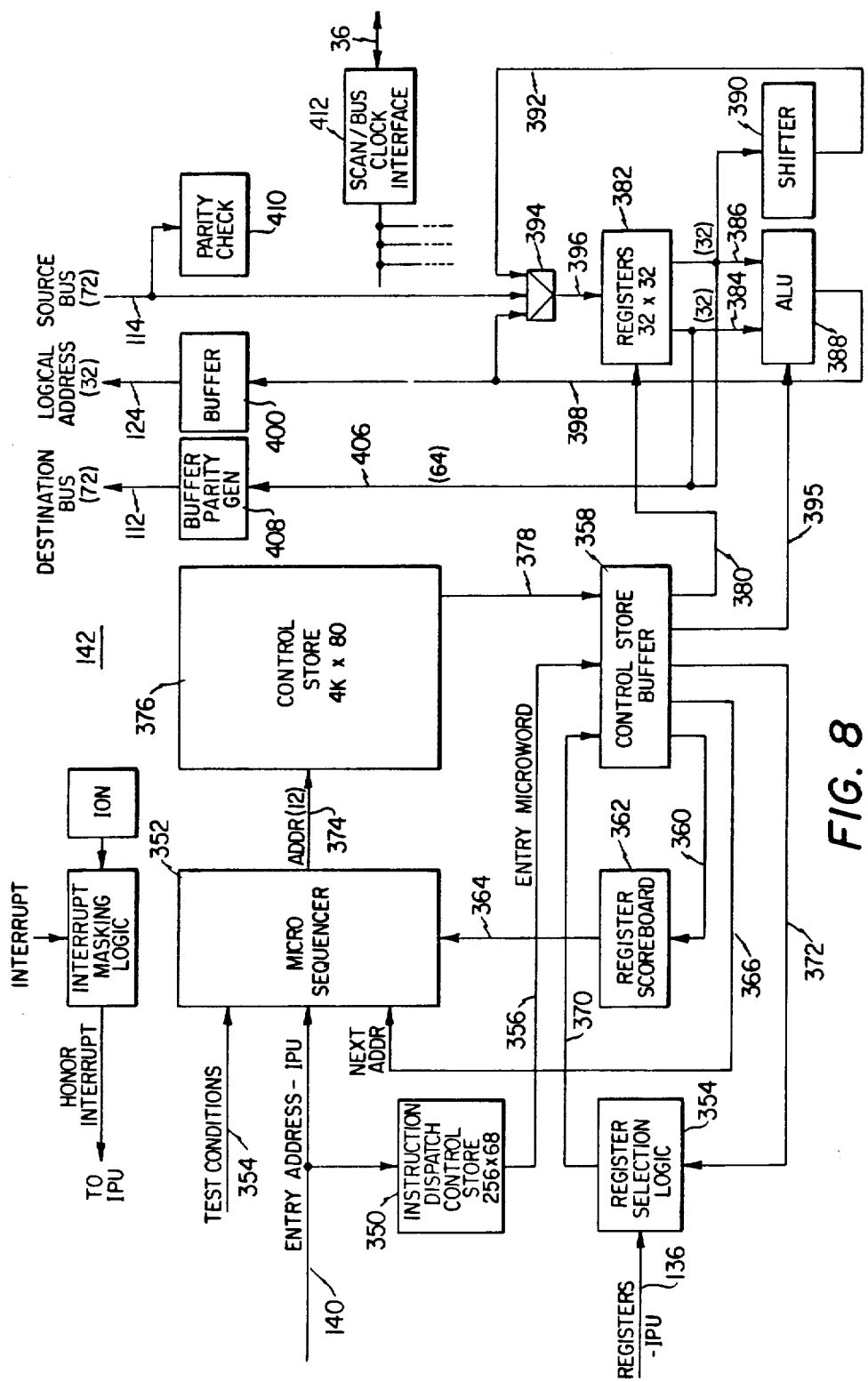
FIG. 8 is a block diagram illustrating the address scalar unit (ASU) shown in FIG. 1B.

The address scalar unit 142, shown in FIG. 1B, is illustrated in detail in FIG. 8. The address scalar unit 142 receives an entry address for a microinstruction via line 140 from the instruction processing unit 126. This entry address is provided to an instruction dispatch control store 350. It is further provided to a microsequencer 352. A set of test conditions are input via a line 355 which is derived from internal ASU elements such as bit positions of buses 384 and 386 or the output of an ALU 388.

Register control information is input through line 136 from the instruction processing unit 126 to register selection logic 354.

The entry address input to the instruction dispatch control store 350 produces an entry microword, in accordance with the present invention, which is transmitted through a line 356 to a control store buffer 358. One output from the buffer 358 is transmitted through a line 360 to the input of a register scoreboard 362. The output of the register scoreboard 362 is transmitted via a line 364 to the microsequencer 352.

A further output of the control store buffer 358 is transmitted as a next address through a line 366 to the microsequencer 352.

The register selection logic 354 produces control information that is transmitted through a line 370 to the control store buffer 358. One output from the control store buffer is provided through a line 372 to the register selection logic 354.

The microsequencer 352 functions as a microprogram counter for producing sequential microaddresses. These addresses are transmitted through a line 374 to a control store 376. The control store 376 contains microwords which are read out and transmitted through a line 378 to the control store buffer 358. A further output of the control store buffer 358 is transmitted through a line 380 to registers 382. The registers 382 store operands, data and instructions and in response to commands produced by microwords, logical operations are carried out by use of the registers.

The registers 382 have two 32 bit output lines 384 and 386 which provide inputs to the arithmetic logic unit 388. Line 386 further provides an input to a shifter 390, the output of which is transmitted through a line 392 to a three input switch 394. The output of switch 394 is transmitted through a line 396 to the registers 382.

A further output of the control store buffer 358 is provided through a line 395 to the arithmetic logic unit 388.

The output of the arithmetic logic unit 388 is passed through a line 398 to provide a second input to the switch 394 and to transfer operands to a buffer 400. The output lines 384 and 386 are further connected to a 64 bit line 406 which provides an input to a buffer parity generator 408. The destination bus 112 receives the output of the buffer parity generator 408. The logical address bus 124 receives the output of buffer 400. The source bus 114 is connected as the third input to the switch 394 as well as to a parity check unit 410.

The computer 20 utilizes microcode to execute machine instructions. For each machine instruction there are a series of microinstructions, also referred to as microwords, which are sequentially executed by the arithmetic logic unit 388 in conjunction with the registers 382 to accomplish the results required by the corresponding machine instruction. Initially the machine instructions are stored in the main memory 99. The machine instructions are decoded in the instruction processing unit 126, described below, and the entry address for the first microinstruction for the decoded machine instruction is transmitted through line 140. The first microinstruction for each machine language instruction is stored in the instruction dispatch control store 350. The remainder of the microinstructions, following the first microinstruction, are stored in the control store 376 for all of the machine instructions. When the entry address is received for the first microinstruction, this address is dispatched to the dispatch control store 350 and a lookup produces the first microinstruction, which is also termed the entry microword. This first microinstruction is entered into the control store buffer 358 where it is decoded to carry out the functions of that microinstruction. The next address for the second microinstruction is conveyed from the buffer 358 through line 366 to the microsequencer 352. This address is transmitted through line 374 to the control store 376 to produce the next microinstruction, the second in the series, which is then transmitted to the control store buffer 358. The lookup of the first microinstruction in the instruction dispatch control store 350 is much faster than routing the entry address directly through the microsequencer 352 to the control store 376 to produce the first microinstruction. The time required for producing the second microinstruction coincides to a substantial extent with the time required for executing the first microinstruction. Therefore the second microinstruction is ready to be loaded into the control store buffer 358 with very little delay. Thus, the use of the entry address and the divided control stores, 350 and 376, provides a technique for significantly increasing the processing speed of the computer 20.

Line 136 transmits the identity of the registers that are used in the instruction to be executed. For example, add R2, R3, the register selection logic determines from which source the register to be manipulated will be selected, either from line 136 or a line 372.

A further feature of the address scalar unit 142 is the register scoreboard 362. Within the scoreboard 362 there are stored a plurality of status bits corresponding to each of the registers within the registers 382. The status bits represent for each register its status as a source or destination for the current microinstruction operations. The status of the register determines when it can be released for use in a subsequent operation. This provides for optimum utilization of the registers and increases the processing speed for executing the microinstructions. The basic operation of a register scoreboard is described in *Parallism in Hardware and Software: Real and Apparent Concurrency*, Harold Lorin, Prentice-Hall, Inc., Copyright 1972.

The address scalar unit 142 further includes a scan/bus clock interface 412 which is connected to line 36 to receive the system clock and diagnostic commands from the service processing unit 42.

Figure 9:
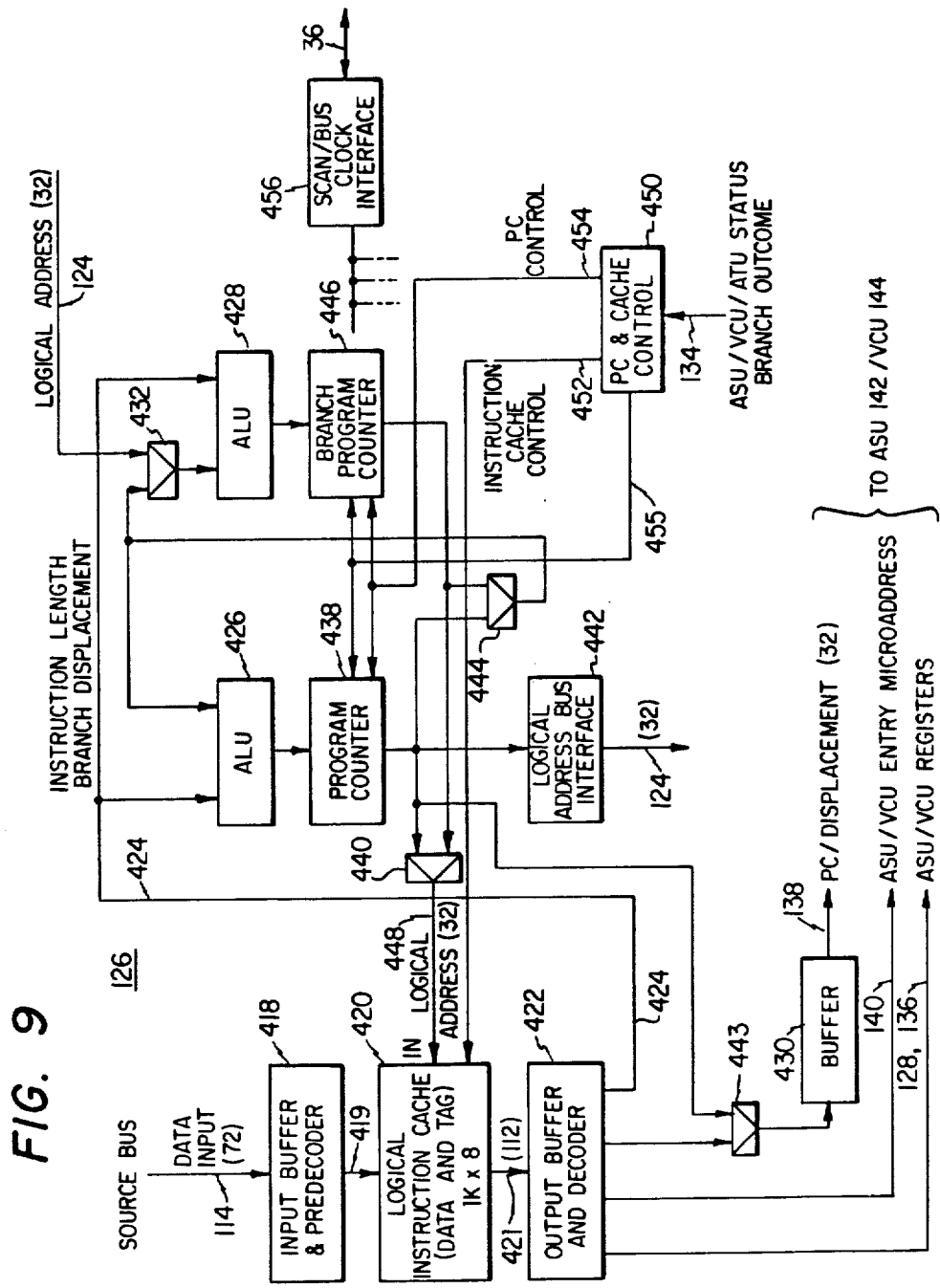
FIG. 9 is a block diagram illustrating the instruction processing unit (IPU) shown in FIG. 1B.

The instruction processing unit 126, which is shown in FIG. 1B, is further illustrated in detail in FIG. 9. The instruction processing unit 126 decodes all machine instructions and provides the initial control information for the instruction execution to be completed. The source bus 114 provides instructions, which are received from the main memory 99 through memory control unit 22, physical cache unit 100 and address translation unit 118 to an input buffer predecoder 418. Each of the machine language instructions is partially decoded and then transferred via a bus 419 for storage in a logical instruction cache 420. For each instruction there is also stored a corresponding address tag for identifying the instruction. The instructions are identified by logical addresses, rather than physical addresses, such that no translation is required to access the instructions within the cache 420.

The instructions retrieved from the cache 420 are passed through a bus 421, 112 bits wide, to an output buffer and decoder 422. The decoder 422 produces four outputs. The first output is transmitted through a line 424 to the inputs of arithmetic logic units (ALU) 426 and 428. A second output of the decoder 422 comprises either a program count or an address displacement and this is passed through a switch 443 to a buffer 430 for subsequent transmission through line 138 to the address scalar unit 142. A third output of the decoder 422 is transmitted through line 140 to provide the entry microaddress to the address scalar unit 142 and the fourth output of the decoder 422 provides opcode/register information to the vector control unit 144 via lines 128 and 136.

The logical address line 124 is directed to a switch 432 which has the output thereof connected to provide the second input to the arithmetic logic unit 428.

The output of the arithmetic logic unit 426 is input to a program counter 438 which transfers its output to a switch 440, a logical address bus interface 442, the switch 443 and a switch 444. The output of the arithmetic logic unit 428 is provided to a program branch counter 446, the output of which is provided as second inputs to the switch 440 and the switch 444.

The output of switch 440 is transmitted through a line 448, 32 bits, which comprises a logical address that is provided as the input to the logical instruction cache 420. The output of the switch 444 is provided as a second input to the ALU 426 and a second input to the switch 432.

The status line 134 from the address scalar unit 142 and the vector control unit 144 is input to a PC and cache control 450 which produces a cache control signal at a line 452 and a PC control signal at a line 454. The control 450 determines whether the instruction processing unit 126 continues to fetch and decode instructions as a function of the status commands produced by the address scalar unit 142, vector control unit 148 and address translation unit 118. The instruction processing unit 126 operates independently of these other three units. For example, if a page fault is encountered in the operation of the address translation 118, a status signal input through line 134 to the control 450 stops the processing of the instruction within the instruction processing unit 126. Control select commands are passed from control 450 through line 455 to the program counter 438 and the program branch counter 446.

The instruction processing unit 126 also includes a scan/bus clock interface 456 which is connected to line 36 to receive the system clock signal as well as diagnostic commands from the service processing unit 42. The clock signals and commands from interface 456 are transmitted to the various parts of instruction processing unit 156.

The primary functions of the instruction processing unit 126 are to maintain the program counter 438 and the branch program counter 446 and to store instructions in cache 420 for rapid retrieval. All the machine instructions executed by the computer 20 are loaded directly from the main memory 99 into the logical instruction cache 420, bypassing the physical cache unit 100 which is maintained exclusively for data storage. The instruction processing unit 126 provides the decoding for the machine language instructions and the generation of the program count, which comprises the logical address for the next sequential instruction.

The arithmetic logic units 426 and 428 are utilized to detect a program branch and generate the appropriate program count for the branch in the branch program counter 446. This count is then transmitted through the switch 440 to form a logical address for the next instruction to be executed following a branch. This use of logic and decoding for branching makes it possible to transfer to a branch instruction in one machine cycle thereby saving the time that is typically lost in conventional pipelined computers when a branch instruction is encountered.

Figure 11:
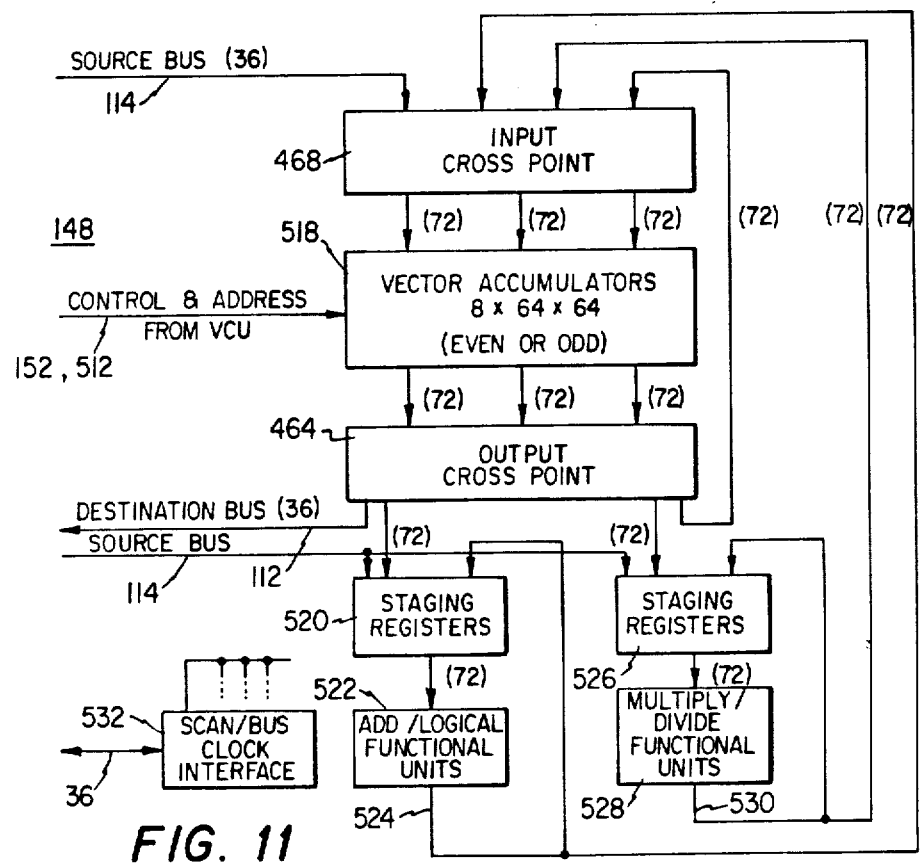
FIG. 11 is a block diagram illustrating the vector processing units (VPU) shown in FIG. 1B.
Figure 10:
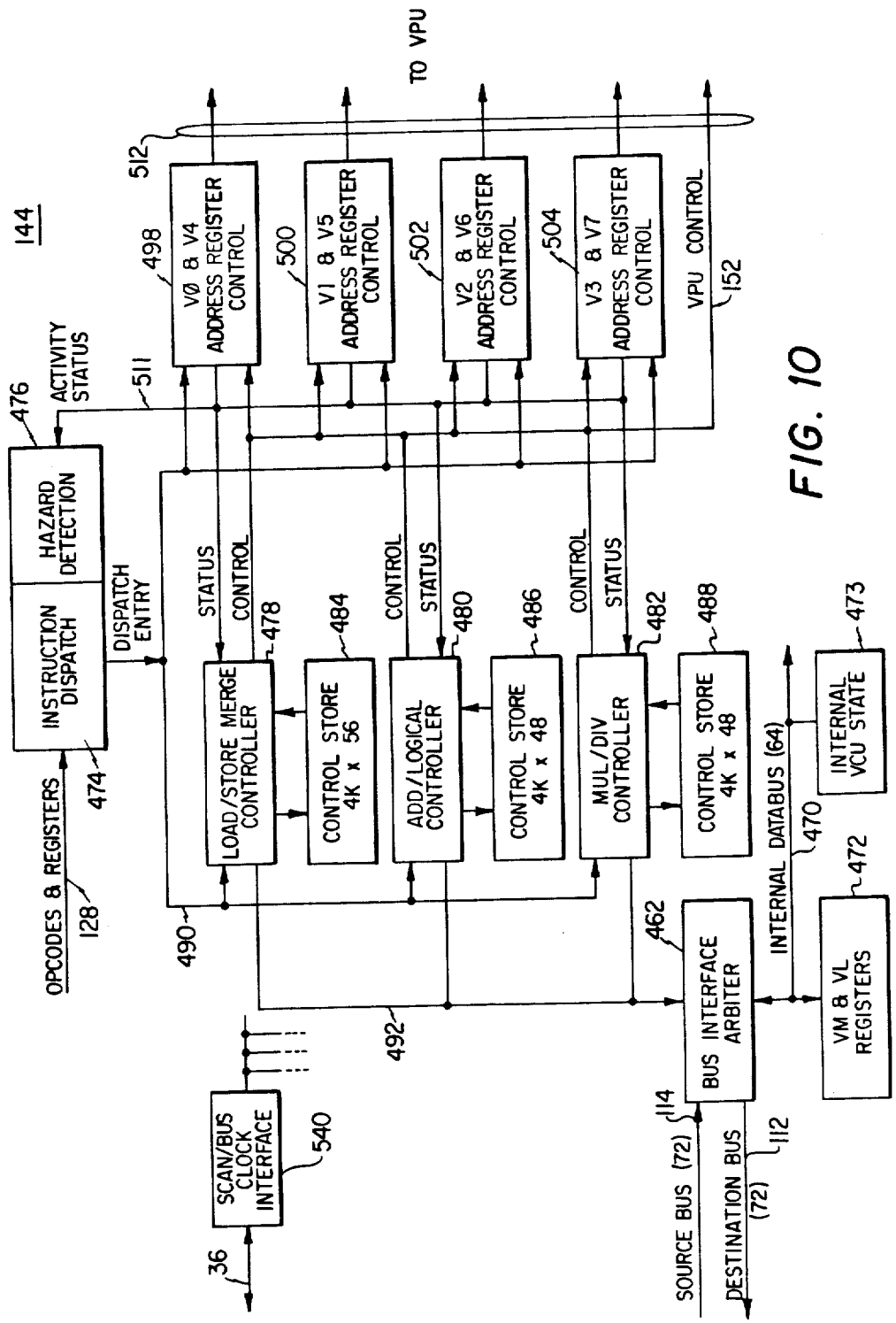
FIG. 10 is a block diagram illustrating the vector control unit (VCU) shown in FIG. 1B.

The vector control unit 144 and the vector processing units 148 and 150, which are illustrated in FIG. 1B, are described in greater detail in FIGS. 10 and 11. The vector control unit and the two vector processing units work in such a close, interrelated manner it is best to describe these units together. Basically the vector control unit 144 provides the decoding of machine language instructions for vector operations and the vector processing units 148 and 150 can be viewed primarily as passive, registered ALUs which carry out functions directly under the control of the vector processing unit 144.

The destination bus 112, in its full width of 72 bits, is connected to a bus interface arbiter 462 in the vector control unit 144. The upper 36 bits of the destination bus 112, 32 operand bits plus 4 bits parity, are connected to receive operands from an output cross point 464 within the vector processing unit 148. The lower 36 bits in destination bus 112 are connected to the corresponding output cross point in the vector processing unit 150. Unit 148 is termed the odd pipe and unit 150 is termed the even pipe. Thus, the destination bus 112 is split between the two vector processing units 148 and 150.

Likewise, the source bus 114, full 72 bits, is connected to the bus interface arbiter 462 within the vector control unit 144. However, the upper 36 bits of the source bus 114 are connected to the vector processing unit 148, odd pipe, at an input cross point 468. The lower 36 bits of the source bus 114 are likewise connected to the corresponding input cross point within the vector processing unit 150. Cross points 464 and 468 are basically router switches which can direct any one of the input ports to any one of the output ports. The full width of source bus 114 is connected to staging registers (described in reference) to FIG. 1 to improve the performance of scalar operations.

Further referring to FIG. 10 the bus interface arbiter 462 is connected to the vector control unit 144 internal data bus 470 (64 bits). The bus 470 is used to load internal VCU machine state information in a unit 473. The machine state information is of two types. The programmer visible machine state information is stored as the VM and VL registers in unit 472. The programmer invisible information, as a result of page fault, typically status registers, and so forth, is stored in the internal VCU state unit 473. VM (vector merge) and VL (vector length) registers 472 are connected to receive operands through the internal data bus 470.

The opcodes and register control information produced by the instruction processing unit 126 are transmitted through line 128 to an instruction dispatch 474. The instruction processing unit 126 further transmits through line 128 an entry microaddress for executing the selected vector machine instruction. Instruction dispatch 474 works in conjunction with a hazard detection 476 to ensure that concurrent execution of multiple instructions do not use the same registers for source and destination of operands. For example, the two instructions add S0, S1 and add S2, and S3 are executed concurrently. However, the two sequential instructions add S0, S1 followed by add S1, S2 can not be concurrent since the second instruction uses the result contents of register S1 of the first instruction. In this example, the instruction add S0, S1 means add the contents of S0 and S1 and store the results in S1. But when there is conflict in the use of the registers, the instructions must be chained to produce the most rapid execution.

The vector control unit 144 includes three independent microcode controllers 478, 480 and 482. Controller 478 is dedicated to load/store merge, control controller 480 is dedicated to add/logical control and controller 482 is dedicated to multiply/divide control. The controllers 478, 480 and 482 each has a respective control store 484, 486 and 488. The control stores contain the microinstructions required to execute the functions for the corresponding controller.

The instruction dispatch produces an entry microword which is transmitted through a line 490 for delivery to one of the controllers 478, 480 and 482. Each of the controllers is connected through an internal bus 492 to the bus interface arbiter for connection to either the source bus 114, the destination bus 112 or the internal data bus 470.

The bus interface arbiter serves to control and allocate the connections between the destination bus 112, source bus 114, internal data bus 470 and internal bus 492.

The vector control unit 144 has four address register controls 498, 500, 502 and 504. Each of these controls is directed to a section of a vector accumulator within the vector processing units 148 and 150. Each of the controllers 478, 480 and 482 can utilize each of the controls 498, 500, 502 and 504 through the control line 152.

The activity and status of the various registers within the accumulators in the vector processing units 148 and 150 is determined by the controls 498, 500, 502 and 504. This information is directed through a status line 511 which is input to the hazard detection 476. By utilizing the information on the status of the various registers, the hazard detection 476 ensures that there is maximum concurrency in the execution of the instructions while there are no conflicts between the use of the registers.

The control line 152 further carries the VPU control information. The outputs of the controls 498, 500, 502 and 504 are communicated through a bus 512 to the vector processing units 148 and 150.

Each of the controllers 478, 480 and 482 operate independently to execute the instructions that it has received. Thus it is possible to have three vector instructions overlapping or in concurrent execution.

Further referring to FIG. 11 the bus 512 and line 152 from the vector control unit 144 are input to vector accumulators 518, which comprises a plurality of vector registers. The vector registers in the accumulators 518 and the corresponding accumulator in vector processing unit 150 are designated as V0–V7. These eight registers are subject to control in pairs by the controls 498, 500, 502 and 504.

The output cross point 464 routes a selected input through a 72 bit line to staging registers 520 which serve to hold operands pending use by logical operators. The output from the staging registers 520 is passed through a 72 bit line to add/logical functional units 522 which perform the logical operations required by the instructions for the operands. The output from units 522 is transmitted through a line 524 to a second input of the staging registers 520 as well as to one of the inputs of the input cross point 468. The line 524 is a 72 bit wide transmission path.

A further output of the output cross point 464 is provided through a 72 bit line to staging registers 526. The output of the registers 526 is passed through a line to multiply/divide functional units 528. The registers 526 and units 528 function in the same manner as registers 520 and units 522. The output of units 528 is transmitted through a 72 bit wide line 530 which provides a second input to the staging registers 526 and a further input to the input cross point 468.

The operation of the vector control unit 144 and the vector processing units 148 and 150 is further described in reference to FIGS. 10 and 11. A significant aspect which contributes to the processing speed of the computer 20 is the parallel use of the vector processing units 148 and 150. The data stored in either main memory 99 or the physical cache unit 100 or the logical data cache 326, all memory units for computer 20 can be transmitted through the source bus 114 directly to the vector processing units 148 and 150. The vectors stored in these memory locations are transmitted as a plurality of elements. The elements are transmitted through the source bus 114 and are alternately input to the vector processing units 148 and 150. The accumulators in the two vector processing units 148 and 150, in a selected embodiment of the present invention, hold a total of 128 elements as a maximum. For a vector having 128 elements, the odd 64 elements (1, 3, ..., 127) are stored in the accumulators in vector processing unit 148 and the even elements (0, 2, ..., 126) of the vector are stored in the accumulators of vector processing unit 150. The instruction which operates on the vectors is first decoded by the instruction processing unit 126 and the resulting opcodes, register information and control is passed to the vector control unit 144 which distributes the commands required to execute the instruction among the three controllers 478, 480 and 482. Each of these controllers produces from its corresponding control store the required microinstructions for executing the required overall instruction. The controllers 498, 500, 502 and 504 then direct the operation of the registers within the vector accumulators and the logical units within the vector processing units 148 and 150. The operands produced by the vector processing units are then transmitted back to the physical cache unit 100, main memory 99, logical data cache 326 or to an input-/output processor on the bus 24.

The vector processing unit 148 further includes a scan/bus clock interface 532 which is connected via line 36 to the service processing unit 42 to receive the system clock signal as well as diagnostic commands. A similar scan/bus clock interface 540 is in vector processing unit 144 to receive the system clock and diagnostic commands via line 36 from the service processing unit 42.

Although one embodiment of the invention has been illustrated in the accompanying drawings and described in the foregoing detailed description, it will be understood that the invention is not limited to the embodiments disclosed, but is capable of numerous rearrangements, modifications and substitutions of parts and elements without departing from the scope of the invention.

What we claim is:

1. A microcode computer wherein each of a plurality of machine instructions is implemented by executing a corresponding series of microinstructions, the computer comprising:

a memory for storing said machine instructions therein, an arithmetic logic unit which receives and executes said microinstructions but does not receive said machine instructions, an instruction processing unit for receiving and decoding said instructions received from said memory, to produce an entry address for the first microinstruction corresponding to a decoded machine instruction;

a dispatch control store connected to receive said entry address and having stored therein the first microinstruction for each of said machine instructions, said dispatch control store producing a selected one of said microinstructions stored therein as determined by said entry address, a main control store for storing therein all of said microinstructions for each of said machine instructions other than the first microinstruction for each of said machine instructions;

a microsequencer for generating addresses for said main control store for producing corresponding microinstructions from said main control store, a control store buffer connected to receive and store microinstructions from both said dispatch control store and said main control store, said control store buffer providing a portion of said first microinstruction from said dispatch store to said microsequencer for generating a second microinstruction address for said main control store, said main control store for providing said second microinstruction and sequentially the remaining microinstructions of said decoded machine instruction to said control store buffer, registers connected between said control store buffer and said arithmetic logic unit for transferring said microinstructions from said control store buffer to said arithmetic logic unit for execution therein, and means for transferring operands between said memory and said arithmetic logic unit in response to said microinstructions executed in said arithmetic logic unit.

2. A microcode computer wherein each of a plurality of machine instructions is implemented by executing a corresponding series of microinstructions, the computer comprising:

a memory for storing said machine instructions therein, an arithmetic logic unit which receives and executes said microinstructions but does not receive said machine instructions, an instruction processing unit for receiving and decoding said instructions received from said memory, to produce an entry address for the first microinstruction corresponding to a decoded machine instruction, a dispatch control store connected to receive said entry address and having stored therein the first microinstruction for each of said machine instructions, said dispatch control store producing a selected one of said microinstructions stored therein as determined by said entry address;

a microsequencer connected to receive said entry address, a main control store for storing therein all of said microinstructions for each of said machine instructions other than the first microinstruction for each of said machine instructions, said main control store connected to receive addresses from said microsequencer, a control store buffer connected to receive and store said microinstructions from said dispatch control store and said main control store and connected to provide said microinstructions stored therein to said logic unit, and to said microsequencer, wherein said microinstructions are executed in said arithmetic logic unit to implement said decoded machine instruction, registers connected to receive said microinstructions from said control store buffer, connected to provide inputs to said logic unit and connected to receive operands from said main memory, and means for selectively routing either said operands from said main memory or the output of said logic unit to said registers.

3. A method for implementing machine instructions in a microcode computer where each machine instruction is carried out by executing a series of microinstructions, comprising the steps of:

storing said machine instructions in a memory, at least partially decoding one of said machine instructions to produce an entry address for each decoded machine instruction, providing said entry address to a dispatch control store which has stored therein the first microinstruction for each of said machine instructions, producing forms aid dispatch controls store a first microinstruction corresponding to said entry address, transmitting said first microinstruction from said dispatch control store to an arithmetic logic unit for execution therein, said arithmetic logic unit for receiving and executing said microinstructions but does not receive said machine instructions decoding a portion of said first microinstruction to produce a second microinstruction address, producing in response to said second microinstruction address a second microinstruction for said decoded machine instruction from a main control stored which has stored therein all of said microinstructions for each of said machine instructions other than the first microinstruction for each of said machine instructions, transferring the second and subsequent microinstructions for said decoded machine instruction from said main control store to said arithmetic logic unit for execution therein, and exchanging operands between said logic unit and said memory in response to said microinstructions.

4. The method recited in claim 3 including the step of manipulating operands in a group of registers in response to said microinstruction.

5. A microcode computer which operates by use of a plurality of machine instructions each of which is implemented by a corresponding series of microinstructions wherein the machine instructions are stored in a main memory, the computer comprising:

an instruction processing unit for receiving said machine instructions from said main memory and decoding each of said received machine instruction to produce an entry address for a first microinstruction corresponding to the machine instruction decoded by said instruction processing unit and to produce register selection information for executing said decoded machine instruction, a dispatch control store connected to receive said entry address and having stored therein the first microinstruction for each of said machine instructions, said dispatch control store producing a selected one of said microinstructions stored therein as determined by said entry address, means for receiving said register selection information, a main control store for storing therein all of said microinstructions for each of said machine instructions other than the first microinstruction for each of said machine instructions, a microsequencer for generating addresses for said main control store for producing corresponding microinstructions from said main control store, a control store buffer connected to receive and store microinstructions from both said dispatch control store and said main control store, said control store buffer for providing a portion of said first microinstruction from said dispatch store to said microsequencer for generating a second microinstruction address for said main control store, said control store buffer connected to receive register selection information from said means for receiving and for providing information from the microinstruction stored in said buffer to said means for receiving, said main control store for storing and providing said second microinstruction and sequentially the remaining microinstructions of said decoded machine instruction to said control store buffer, and arithmetic logic unit, registers connected between said control buffer and said arithmetic logic unit for receiving register selection information from said control store buffer and for transferring said microinstruction from said control store buffer to said arithmetic logic unit for execution therein in response to said register selection information, and means for transferring operands between said memory and said arithmetic logic unit for supplying operands required by said decoded machine instruction.

* * * * *

UNITED STATES PATENT AND TRADEMARK OFFICE
CERTIFICATE OF CORRECTION

PATENT NO. : 4,812,972

DATED : March 14, 1989

INVENTOR(S) : Chastain, et al.

It is certified that error appears in the above-identified patent and that said Letters Patent is hereby corrected as shown below:

Col. 2, line 68, following the word "diagram", please insert the punctuation mark -- . --.

Col. 3, line 42, immediately following the word "unit", please insert the numeral -- 52. --.

Col. 3, line 55, immediately following the numeral "54", please insert the punctuation mark -- . --.

Col. 5, line 26, please delete the word "Piplined" and substitute therefor the word -- Pipelined --.

Col. 6, line 36, immediately following the word "through", please delete the punctuation mark -- , --.

Col. 7, line 12, immediately following the word "operand", please delete the punctuation mark -- , --.

Col. 7, line 18, please delete the word "retrieve" and substitute therefor the word -- retrieved --.

Col. 11, line 47, please delete the word "us" and substitute therefor the word -- bus --.

Col. 11, line 58, please delete the numeral "14..51" and substitute therefor the numeral -- 14..5 --.

Col. 18, line 21, immediately following the word "reference" please delete the symbol -- ) --.

Col. 18, line 21, immediately following the numeral "1", please insert the symbol -- ) --.

UNITED STATES PATENT AND TRADEMARK OFFICE
CERTIFICATE OF CORRECTION

PATENT NO. : 4,812,972
DATED : March 14, 1989
INVENTOR(S) : Chastain, et al.

It is certified that error appears in the above-identified patent and that said Letters Patent is hereby corrected as shown below:

Col. 22, line 10, please delete the words "forms aid" and substitute therefor the words -- from said --.

Col. 22, line 10, please delete the word "controls" and substitute therefor the word -- control --.

Col. 22, line 18, immediately following the word "instructions", please insert the punctuation mark -- , --.

Col. 22, line 24, please delete the first occurrence of the word "stored" and substitute therefor the word -- store --.

Col. 22, line 44, please delete the word "instruction" and substitute therefor the word -- instructions --.

Signed and Sealed this

First Day of June, 1993

Attest:

MICHAEL K. KIRK

Attesting Officer

Acting Commissioner of Patents and Trademarks